US011815899B2

(12) United States Patent
Williams, Jr. et al.

(10) Patent No.: US 11,815,899 B2
(45) Date of Patent: Nov. 14, 2023

(54) COGNITIVE INDUSTRIAL FLOOR CLEANING AMELIORATION

(71) Applicant: INTERNATIONAL BUSINESS MACHINES CORPORATION, Armonk, NY (US)

(72) Inventors: Ernest Bernard Williams, Jr., Dallas, TX (US); Zachary James Goodman, Bedford, TX (US); Henry Ramsey Bissex, Irving, TX (US); Jeremy R. Fox, Georgetown, TX (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 226 days.

(21) Appl. No.: 17/234,286

(22) Filed: Apr. 19, 2021

(65) Prior Publication Data
US 2022/0330779 A1 Oct. 20, 2022

(51) Int. Cl.
*G05D 1/02* (2020.01)
(52) U.S. Cl.
CPC ........ *G05D 1/0219* (2013.01); *A47L 2201/04* (2013.01)
(58) Field of Classification Search
CPC .............. G05D 1/0219; A47L 2201/04; A47L 11/4011; A47L 2201/06; G05B 2219/45098; B25J 9/163
See application file for complete search history.

(56) References Cited

U.S. PATENT DOCUMENTS

| 8,577,499 B2 | 11/2013 | Eliasson |
| 9,011,607 B2 | 4/2015 | De Luca et al. |
| 9,946,263 B2 | 4/2018 | Lindhe et al. |
| 10,365,659 B2 | 7/2019 | Park et al. |
| 10,394,246 B2 | 8/2019 | Moshkina-Martinson et al. |
| 10,463,217 B1 | 11/2019 | Bialek et al. |
| 2019/0213438 A1* | 7/2019 | Jones ................. G06V 20/10 |
| 2019/0246852 A1 | 8/2019 | Klintemyr et al. |
| 2019/0320866 A1 | 10/2019 | Thorne et al. |
| 2019/0346853 A1 | 11/2019 | Gabrecht et al. |
| 2020/0004258 A1 | 1/2020 | Chen et al. |
| 2020/0019180 A1 | 1/2020 | Chae |
| 2020/0027336 A1 | 1/2020 | Cho et al. |
| 2020/0039068 A1* | 2/2020 | Kim ..................... G06V 40/20 |

(Continued)

OTHER PUBLICATIONS

Kim et al.; "Control Strategies For Cleaning Robots In Domestic . . . A Comprehensive Review", International Journal Of Advanced Robotic Systems, pp. 1-21, Jul.-Aug. 2019.

(Continued)

*Primary Examiner* — Khoi H Tran
*Assistant Examiner* — Tien Minh Le
(74) *Attorney, Agent, or Firm* — Conley Rose, P.C.

(57) ABSTRACT

A computer-implemented method includes receiving data regarding an area to be cleaned, the data comprising data regarding movement of people or machines through the area to be cleaned; training a machine learning cleaning model based on the data; creating a floor cleaning plan using the machine learning cleaning model, the floor cleaning plan identifying a cleaning time to minimize a likelihood of a robotic cleaning device encountering a person or a machine while cleaning; and transmitting the floor cleaning plan to a robotic cleaning device.

20 Claims, 6 Drawing Sheets

(56) References Cited

U.S. PATENT DOCUMENTS

| | | | |
|---|---|---|---|
| 2020/0053324 A1* | 2/2020 | Deyle | G05D 1/0088 |
| 2020/0225673 A1* | 7/2020 | Ebrahimi Afrouzi | A47L 9/0472 |
| 2021/0278240 A1* | 9/2021 | Takayanagi | G05D 1/0212 |
| 2022/0304529 A1* | 9/2022 | Jones | A47L 9/28 |

OTHER PUBLICATIONS

Elliott et al.; "Robotic Cleaning Through Dirt Rearrangement Planning With Learned Transition Models", ICRA IEEE International Conference On, pp. 1-8, May 21-25, 2018.

Pham et al.; "Hybrid Spiral STC-Hedge Algebras Model In . . . Robot Coverage Path Planning And Its Applications", Applied Sciences, vol. 9, Issue 9, pp. 1-16, May 9, 2019.

Vaussard et al.; "Lessons Learned From Robotic Vacuum Cleaners Entering The Home Ecosystem", Robotics And Autonomous Systems, vol. 62, pp. 376-391, Oct. 8, 2013.

Le et al.; "A Multi-Robotic System For Environmental Cleaning", Cornell University Library, arXiv:1811.00690v1, pp. 1-6, Nov. 2, 2018.

* cited by examiner

COGNITIVE INDUSTRIAL FLOOR CLEANING AMELIORATION

STATEMENT REGARDING FEDERALLY SPONSORED RESEARCH OR DEVELOPMENT

Not applicable.

STATEMENT REGARDING PRIOR DISCLOSURES BY THE INVENTOR OR A JOINT INVENTOR

Not applicable.

BACKGROUND

The present disclosure relates to the field of floor cleaning and cognitive industrial floor cleaning.

In any industry, periodic cleaning is required. In some cases, work is going on and the cleaning operations need to be performed in parallel. This means both workers and machinery can potentially move both in and around the area being cleaned. In the event that workers or machinery enters an area while it's being mopped, the floor will have to be cleaned again. Also, air flow direction is important during dusting. If cleaning is being performed against the air flow direction, the cleaned area will become dirty, as dust will fly towards the cleaned area.

SUMMARY

Aspects of the disclosure provide for a computer program product for cognitive floor cleaning. In at least some examples, the computer program product includes a computer readable storage medium having program instructions embodied therewith. The program instructions are executable by a processor to cause the processor to receive data regarding an area to be cleaned, the data comprising data regarding movement of people or machines through the area to be cleaned; train a machine learning cleaning model based on the data; create a floor cleaning plan using the machine learning cleaning model, the floor cleaning plan identifying a cleaning time to minimize a likelihood of a robotic cleaning device encountering a person or a machine while cleaning; and transmit the floor cleaning plan to the robotic cleaning device.

Other aspects of the disclosure provide for a computer-implemented method. In at least some examples, the method includes receiving data regarding an area to be cleaned, the data comprising data regarding movement of people or machines through the area to be cleaned; training a machine learning cleaning model based on the data; creating a floor cleaning plan using the machine learning cleaning model, the floor cleaning plan identifying a cleaning time to minimize a likelihood of a robotic cleaning device encountering a person or a machine while cleaning; and transmitting the floor cleaning plan to the robotic cleaning device.

Other aspects of the disclosure provide for a machine learning system. In at least some examples, the machine learning system includes a processor configured to receive data regarding an area to be cleaned, the data comprising data regarding movement of people or machines through the area to be cleaned; train a machine learning cleaning model based on the data; create a floor cleaning plan using the machine learning cleaning model, the floor cleaning plan identifying a cleaning time to minimize a likelihood of a robotic cleaning device encountering a person or a machine while cleaning; and transmit the floor cleaning plan to the robotic cleaning device.

DETAILED DESCRIPTION

Figure 1:
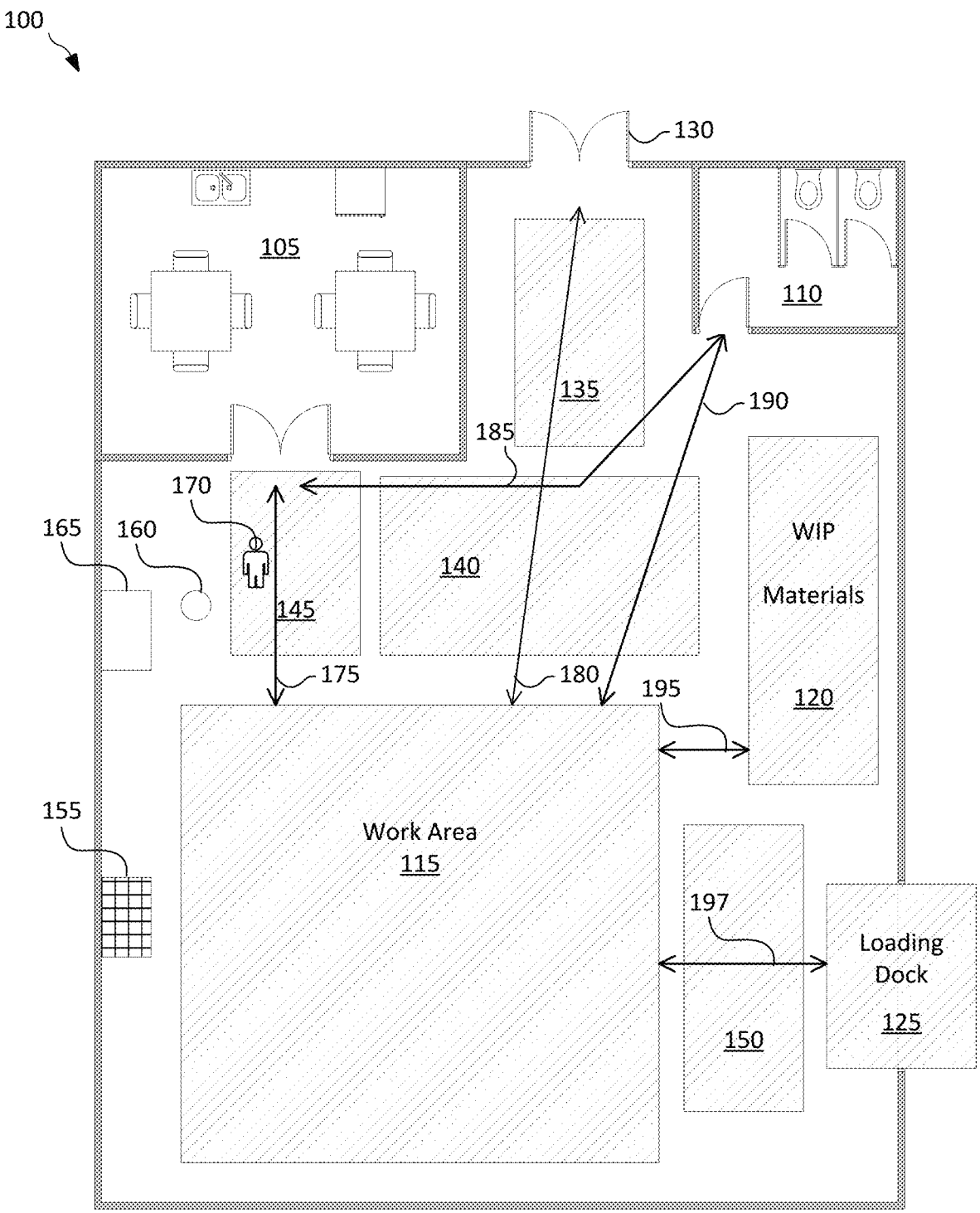
FIG. 1 depicts a diagram of an embodiment of an area to be cleaned 100. The area to be cleaned 100 in this example is a manufacturing facility.

Various factors contribute to lack of cleanliness of floors. Foot traffic, traffic of equipment around an area, and blowing dust are just a few examples of factors that lead to dirty floors in an area. Periodic cleaning of the floors is needed for safety and aesthetic reasons. In areas where work is going on, the cleaning operations may need to be performed in parallel with work operations. This means both workers and machinery may move in and around the area being cleaned. In the event that workers or machinery enter an area being cleaned, the floor may have to be cleaned again. Also, air flow direction in the area being cleaned may be considered. If cleaning is performed against the air flow direction, the cleaned area may become dirty, as dust will fly towards the cleaned area. Floor cleaning may be performed by robotic cleaning devices. While the floor is being cleaned, the robotic cleaning device should consider the direction of air flow through the area, predicted movement path of workers, machines, position of obstacles, etc. Otherwise, cleaning will not be proper and the robotic cleaning device will need to perform rework. Described herein are embodiments that provide a robotic cleaning device that will consider various parameters which can influence the quality of cleaning and/or reduce rework.

In at least some examples, while cleaning, the robotic cleaning device may consider historical movement paths of the workers and machines on the target area to be cleaned, and accordingly identify appropriate timing to clean different sections of the target area so that movement of the workers or machines etc. can be avoided. The robotic cleaning device may also consider the inclination of floor to identify the direction of water movement on the floor and adjust cleaning routes as necessary. For example, if water is dirty identifying how the dirty water will flow and determining a cleaning route that avoids dirty water running onto a clean area. The robotic cleaning device may predict how dust and other debris may spread based on external influencing factors, for example air flow, walking direction of the workers, or machines, etc. and identify a direction of cleaning to minimize rework.

The robotic cleaning device may consider the type of cleaning activities, time required to get the floor dry after cleaning, and accordingly communicate with a communication device of an occupant of the area to show a restricted area for a defined time so that the occupant may avoid the area being cleaned. For example, the robotic cleaning device may use historical data to determine that cleaning the floor takes 30 minutes and drying time is 15 minutes. The robotic cleaning device may communicate with a device of the occupant to inform that occupant not to enter the area being cleaned for 45 minutes. Alternatively, the robotic cleaning device may communicate a time, for example 2 PM, when the occupant may reenter the area being cleaned. The occupant's device may offer alternate routes for the occupant to take to avoid the area being cleaned. Further, the robotic cleaning device may communicate with other automated equipment to instruct the other equipment to avoid the area being cleaned. For example, automated manufacturing equipment may be directed to avoid the area while the floor is wet.

While the floor is being cleaned, if a human obstacle is detected along the movement path of the robotic cleaning device, then the robotic cleaning device may communicate with a communication device of the human, for example, a head mounted augmented reality device, a haptic device of the worker, etc. The communication may include a request that the human move from the cleaning path, the direction where the worker should move, and/or a path of the robotic cleaning device.

The robotic cleaning devices described herein are controlled by a cleaning control system. The cleaning control system may execute locally on the robotic cleaning device, at a remote location, e.g., a cloud computing environment in communication with the robotic cleaning device, or some combination of local and remote execution. While some examples describe operations performed by a robotic cleaning device, the techniques may be applied to a system utilizing multiple robotic cleaning devices. Multiple robotic cleaning devices may be useful for cleaning a relatively large or complex area, e.g. several areas may be cleaned at the same time when several robotic cleaning devices are present in the system.

The cleaning control system may be configured to capture data regarding the movement of people and machines in a particular area, for example within a manufacturing facility or office environment. The data may include the paths taken by people and machinery through the area and the times when people and machines are traversing the paths. The data may be gathered by sensors. The sensors include various types of sensors for detecting motion or presence of the people and machines in the area to be cleaned. The sensors may be installed in various locations, including but not limited to people's shoes or clothing, within the machines traversing the area, within people's electronic devices, on walls or other fixed surfaces of the area to be cleaned, etc. In addition to or in lieu of the data provided by sensors, a user may enter data about times when people or machines will be traversing or working in an area. The user may enter the data using an interface to the cleaning control system, for example a web-based user interface.

The cleaning control system may perform a temporal analysis of the data collected by the sensors and any data entered by a user. The temporal analysis may be used to determine typical movement patterns of people and machines. The temporal analysis may also be used to determine typical times when people and machines are moving through the typical movement patterns. The patterns may be based on times, events, and/or duration of the movements.

The cleaning control system may use historical data from sensors and other sources to identify a direction of air flow through the area to be cleaned. The direction of air flow may be used to identify how dust may be spread in the area. The air may be caused by forced air heating ventilation and cooling (HVAC), doors opening and closing, exterior winds, and movement of people and machines through the area.

The cleaning control system may gather additional data to include a map of the area where the cleaning is to occur, inclination of floors in the area where the cleaning is to occur, what types of cleaning are needed in the area where the cleaning is to occur, e.g., sweeping, mopping, etc. The cleaning control system evaluates collected data and/or the temporal analysis to predict the movement of people and machines through the area where cleaning will occur. The cleaning control system evaluates collected data to determine how dust travels and/or accumulates in the area where cleaning will occur.

Using the predictions regarding movement of people and machines and, in some examples, the dust flow, the cleaning control system creates a floor cleaning plan. For example, dust flow may be considered when choosing a direction of travel for the robotic cleaning devices such that dust does not blow onto freshly cleaned floors. The cleaning control system may then dispatch robotic cleaning devices to execute the floor cleaning plan. In some examples, the cleaning control system may communicate the movement path of the robotic cleaning devices to mobile machines and people so that the machines and people can identify alternate paths for travel during cleaning. In some examples, the cleaning control system or the robotic cleaning devices may detect a person in the cleaning path and communicate with the person. The communication may be through devices of the person or via a speaker or other communication apparatus on the robotic cleaning device or in the vicinity of the person. For example, the cleaning control system may communicate with an augmented reality device of the person to show the restricted path as the floor is being cleaned and may also show alternate movement paths to the person. In some examples, the cleaning control system pay provide haptic feedback to the person via a device worn or in contact with the person. The cleaning control system may also evaluate a movement path of a person and predict that the person is on course to cross the cleaning path of the robotic cleaning devices. In this case, the cleaning control system or the robotic cleaning device may communicate the cleaning path to the person and may also suggest an alternate route for the person. In some examples, the person may be performing a task that cannot be interrupted and the person may communicate with the cleaning control system and/or the robotic cleaning device to request that the robotic cleaning device alter its path.

In some examples, a corpus of data may be stored. The cleaning control system may access the corpus of data when determining cleaning routes and times. The corpus may be stored remotely, for example in a cloud-based storage system, or locally, for example in a local database. The corpus may include data input by a user and/or data gathered by sensors or other monitoring devices in the operating area of the cleaning control system and robotic cleaning devices. The corpus may include data regarding when certain areas are used by people or machinery and schedule cleaning of those areas accordingly. For example, if an entry way is used at shift change and an assembly area is used during the shift, the cleaning of the entry way may be scheduled for between shift changes. The corpus may also include data regarding drying times of surfaces that use wet cleaning, e.g., mopping. The cleaning control system may use the data on drying times to ensure cleaning is competed with adequate drying time prior to predicted entry times of people or machinery into the area to be cleaned. The corpus may also include data regarding flooring types in areas to be cleaned. The cleaning control system may use the data on flooring types in determining types of cleaners, cleaning methods, drying times, etc. for the area to be cleaned.

FIG. 1 is a diagram of an embodiment of an area to be cleaned 100. The area to be cleaned 100 in this example is a manufacturing facility. Other types of buildings and areas may be cleaned by the cleaning system described herein. The area to be cleaned 100 is subdivided into several areas. The areas may be identified based upon traffic patterns of people and machines, walls, or other partitions. For example, area 145 and area 140 are identified based upon traffic of people and break area 105 is identified based upon the walls surrounding it. The area to be cleaned 100 includes the break area 105, restroom 110, work area 115, materials area 120, and areas 135, 140, 145, and 150. The area to be cleaned 100 also includes door 130, loading dock 125, and air vent 155.

People and machinery in the area to be cleaned 100 may regularly traverse routes 175, 180, 185, 190, 195, and 197. These routes may be identified using various sensors (not pictured) in the area to be cleaned 100, sensors installed on equipment of people in the area to be cleaned 100, or sensors installed on machines in the area to be cleaned 100. Data collected from the sensors may be stored in a corpus of data. The corpus may be cloud based or stored locally. The corpus is accessible by cleaning control system 165. The corpus may also include data regarding air flow patterns in the area to be cleaned 100. Air flow may come from air vent 155, door 130, and/or loading dock 125. Air flow may also be created by the movement of people and machines through the area to be cleaned 100. The corpus may also include data input by a user, for example, scheduled shift changes, dimensions of the area to be cleaned, and other data for use in cleaning. Weather data may be stored in the corpus as well. Weather data may be used to determine if people will track mud or snow into the area to be cleaned. Weather data may also be used to determine air flow conditions that may lead to dust entering the door 130 or loading dock 125. Cleaning durations may be stored in the corpus as well. For example, the cleaning control system 165 may store data regarding how long it takes the robotic cleaning device 160 to clean areas 145, 140, etc. The stored cleaning durations may be used in determining optimal times of day to clean the areas.

The robotic cleaning device 160 may be an automated cleaning device configured to execute cleaning instructions received from the cleaning control system 165. The robotic cleaning device 160 may include various cleaning devices including, but not limited to brushes, mops, vacuums, suction devices, spraying devices. The robotic cleaning device 160 may include reservoirs for holding unused cleaning solutions and used cleaning solutions. The robotic cleaning device 160 may include a reservoir for dust or other debris collected during cleaning. The robotic cleaning device 160 may include squeegees or other devices for collecting used cleaning solutions from a floor being cleaned.

Cleaning control system 165 retrieves data from the corpus for use in determining cleaning routes and cleaning times for robotic cleaning device 160. For example, the corpus may include data indicating that shift change occurs daily at 8 am. Sensors monitoring area 135 and 140 may track workers transiting along route 180 from door 130 to work area 115. The sensors may include cameras, proximity detectors, and other sensors installed in the area to be cleaned. Additionally, the workers may share sensor data from their user devices with the corpus. For example, mobile device may transmit location updates to the corpus. Based on the data in the corpus, the cleaning control system 165 may determine that the best time of day to clean area 135 is between shift changes, for example at 10 am. In another example, the corpus may include data indicating a direction of airflow from air vent 155. The data may indicate that air flows from air vent 155 toward loading dock 125. Based on this data, the cleaning control system 165 may determine a cleaning pattern for the robotic cleaning device 160 for the work area 115 that begins near air vent 155 and works towards loading dock 125, such that dust would blow onto an uncleaned portion of the work area 115.

In another example, the corpus may include data indicating machine movement in the area to be cleaned 100. Machines may move along route 195 to retrieve materials for the work area 115 from materials area 120. Machines may move along route 197 to move finished product from work area 115 to loading dock 125. The corpus may also include data about what time of day the machines traverse routes 195 and 197. The cleaning control system may determine to clean area 150 during a shift change when machines are not traversing route 197.

In another example, robotic cleaning device 160 may be cleaning area 145 and detect a person 170. Upon detecting the person 170, the cleaning control system 165 or robotic cleaning device 160 may send an alert to the person 170. The alert may be an audible or visual alert from the robotic cleaning device 160 and/or an alert sent to a device of the person 170, for example an alert to a mobile device or other wearable of the person 170. In another example, prior to cleaning an area, the cleaning control system may transmit an alert to all users in the area to be cleaned 100. The alert may include for example, an identifier of the area to be cleaned, what time the area will be cleaned, how long cleaning will take, and how long it will take for the area to dry. The alert may also include alternative routes of travel to avoid an area that is being cleaned.

In another example, the cleaning control system 165 may access data from the corpus regarding the presence of people and machines in work area 115. The cleaning control system 165 may determine that work area 115 may be cleaned during lunch break when people and machines leave work area 115 for break area 105. The corpus may also store data regarding how long it will take to clean work area 115. Based on this data and data regarding the duration of the lunch break, the cleaning control system may determine there is not enough time to complete cleaning of the work area 115 during a lunch break and may instead schedule cleaning of the work area 115 for after hours. In another example, the cleaning control system may determine that assigning additional robotic cleaning devices 160 to clean work area 115 reduces the time required to clean work area 115. In this case, the cleaning control system may schedule cleaning of the work area 115 during a lunch break if additional robotic cleaning devices 160 are available.

Figure 2:
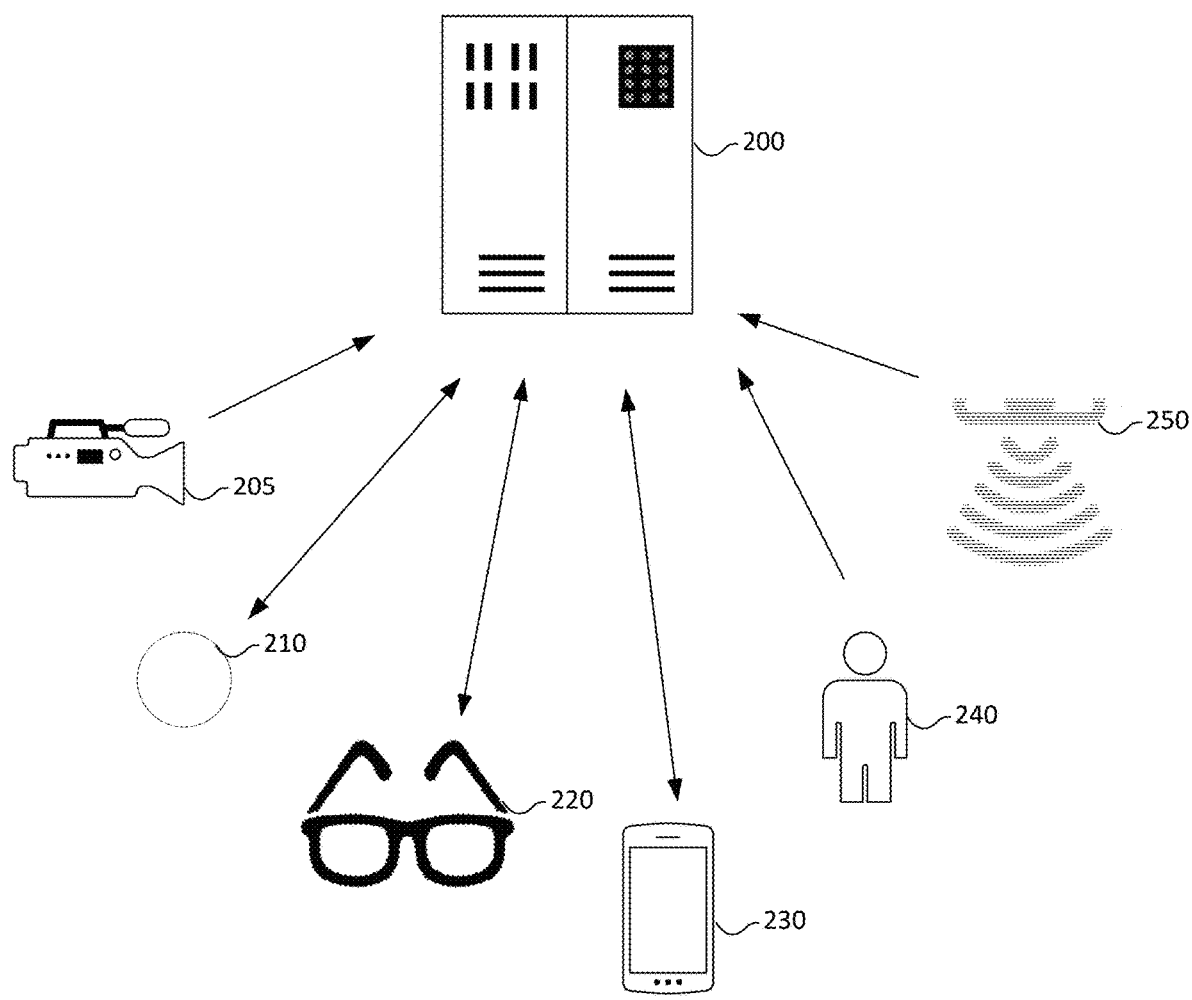
FIG. 2 depicts a diagram of an embodiment of a cleaning control system 200.

FIG. 2 is a diagram of an embodiment of a cleaning control system 200, cleaning control system 200 may function similarly to cleaning control system 165. The cleaning control system 200 may interact with cameras 205, robotic cleaning devices 210 (similar to robotic cleaning device 160), wearables 220, mobile devices 230, users 240, and sensors 250. The cleaning control system 200 may interact with devices and users in a wired or wireless communication manner. In some examples, other devices or people may interact with the cleaning control system 200 for providing data that may be used in cleaning an area to be cleaned, e.g., area to be cleaned 100. The cleaning control system 200 includes logic for controlling robotic cleaning devices, e.g. robotic cleaning device 160 and 210. The cleaning control system 200 includes a corpus of data. The corpus of data includes, but is not limited to, historical data regarding movement of people and or machines through an area to be cleaned, data regarding characteristics of the area to be cleaned, other historical data regarding cleaning operations, etc. The corpus may be stored locally or in a cloud-based environment. The cleaning control system 200 may be executed locally or in a cloud-based computing environment.

Cameras 205 may provide data to the cleaning control system 200 and corpus. The data may include, but is not limited to, data regarding presence of people and/or machines in an area monitored by the cameras 205. This data may be used to determine when areas are occupied and when they are not occupied. This data may also be used for notifying people and/or machines that an area they are occupying or about to occupy is being cleaned or will be cleaned soon. The cameras 205 may also be used to monitor the condition of floors before, during, and after cleaning in order to identify and schedule recleaning. For example, the cameras may identify a person in an area that has recently been cleaned. If the floor is not yet dry, a recleaning may be needed.

Robotic cleaning devices 210 provide data to the cleaning control system 200 and corpus. The data may include, but is not limited to, cleaning capabilities of the robotic cleaning devices 210, for example, types of wet or dry cleaning, cleaning products, speed of the robotic cleaning devices, etc. The robotic cleaning devices may also provide data regarding presence of people and/or machines in proximity to the robotic cleaning devices 210, for example if the robotic cleaning device 210 detects a person or machine in proximity, an alert may be sent. The robotic cleaning devices 210 may also provide location data to identify where they currently are cleaning. The robotic cleaning devices 210 may also provide data regarding types of floors in the area to be cleaned and incline of floors to be cleaned. The cleaning control system 200 may transmit cleaning instructions to the robotic cleaning devices 210, for example, areas to be cleaned and times to clean.

Wearables 220 provide data to the cleaning control system 200 and corpus. The data may include, but is not limited to, location data of the wearer. The location data may be used in combination with time data to determine when areas may be occupied. The cleaning control system 200 may transmit alerts to the wearables 220. The alerts may indicate that the wearer is in an area being cleaned. The alerts may identify areas that are scheduled to be cleaned. The alerts may indicate alternative routes for the wearer to avoid the areas being cleaned.

Mobile devices 230 provide data to the cleaning control system 200 and corpus. The data may include, but is not limited to, location data of the user. The location data may be used in combination with time data to determine when areas may be occupied. The cleaning control system 200 may transmit alerts to the mobile devices 230. The alerts may indicate that the user is in an area being cleaned. The alerts may include identifiers of areas that are scheduled to be cleaned. The alerts may indicate alternative routes for the user to avoid the areas being cleaned.

Users 240 provide data to the cleaning control system 200 and corpus. The data may include, but is not limited to, schedules of people in the area to be cleaned, data regarding types of floors in the area to be cleaned, data regarding incline of floors to be cleaned, dimensions or area to be cleaned, etc. Users 240 may include users of the cleaning control system 200 or others that have access to the cleaning control system 200.

Sensors 250 provide data to the cleaning control system 200 and corpus. The data may include, but is not limited to, presence of people or machines in the area to be cleaned, duration of time people or machines are in the area to be cleaned, etc. Sensors 250 may include various types of sensors, for example, infrared sensors, ultrasonic sensors, motion detectors, etc.

Figure 3:
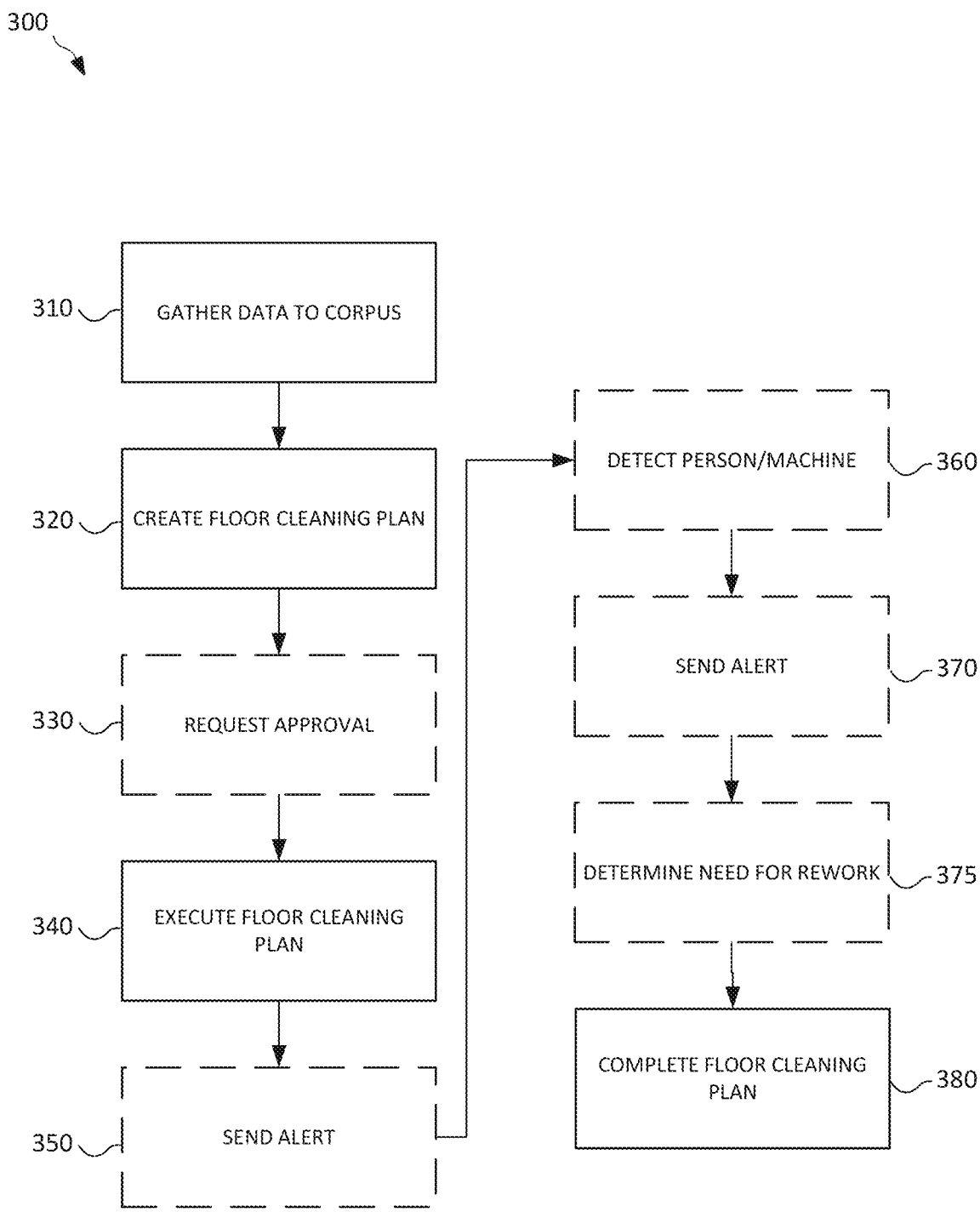
FIG. 3 depicts a flowchart of an embodiment of a method 300 for cognitive floor cleaning.

FIG. 3 is a flowchart of an embodiment of a method 300 for cognitive floor cleaning. The method 300 begins at block 310 where a cleaning control system, e.g. cleaning control system 165 and 200, gathers data to a corpus. The corpus may include data from a variety of sources, e.g., cameras 205, robotic cleaning devices 210 (similar to robotic cleaning device 160), wearables 220, mobile devices 230, users 240, and sensors 250. The corpus includes data related to the area to be cleaned (e.g., area to be cleaned 100), including but not limited to, dimensions of the area to be cleaned, times and durations people and machines are present in the area to be cleaned, types of floors in the area to be cleaned, air flow through the area to be cleaned, incline of the floors in the area to be cleaned, etc.

The method 300 continues are block 320 when the cleaning control system creates a floor cleaning plan. The floor cleaning plan is created based on the data of the corpus. A machine learning cleaning model is trained using the data of the corpus. The floor cleaning plan is then created using the cleaning model and the data of the corpus. In an example, routes and times for cleaning are determined by the cleaning control system based on the cleaning model and the data of the corpus. The floor cleaning plan may schedule a cleaning time to minimize the likelihood of a robotic cleaning device encountering a person or machine while cleaning. For example, determining when workers are not historically present in an area and scheduling cleaning for that area during that time. The floor cleaning plan may also consider drying times and other environmental factors. The floor cleaning plan may include routes to avoid dust blowing onto clean floors and the floor cleaning plan may include routes to avoid liquid runoff based on data bout the slopes of floors.

Optionally, at step 330 the cleaning control system may send the floor cleaning plan to a user for approval. The request may be transmitted to a user device, e.g., mobile device, computer, etc. The user may review the cleaning plan and approve or deny the cleaning plan. The user may also propose modifications to the plan. If the cleaning plan is rejected, the method 300 returns to block 320 where the cleaning control system creates a new cleaning plan. If the cleaning plan is accepted or modified, the method continues at block 340 where the cleaning plan is executed by the cleaning control system. The cleaning control system executes the cleaning plan by sending instructions to robotic cleaning devices, e.g., robotic cleaning devices 160 and 210.

Optionally, at block 350 the cleaning control system may send an alert to people and machines in the area to be cleaned using the cleaning plan. The alert may be sent to controllers of the machines. The alert may be sent to devices of people in the area to be cleaned, for example mobile devices and wearables. The alert may also be broadcast audibly from speakers in the area to be cleaned. Other indications may be used to alert people and machines of the cleaning plan. The alert may include one or more of identifying the area to be cleaned, identifying the time of the cleaning, and identifying alternate routes to avoid the area being cleaned.

After cleaning has begun, a person or machine may be detected in the area being cleaned. The person or machine may be detected by sensors mounted on the robotic cleaning devices or by sensors in or near the area being cleaned. For example, a wall mounted camera may transmit images to the cleaning control system which identifies a person or machine in the area being cleaned.

If a person or machine is detected in the area being cleaned an alert is sent to the person or machine at block 370. The alert may include a message indicating that the person or machine is an area currently being cleaned. The alert may include alternative routes to leave and avoid the area being cleaned. In an example, the alert may be transmitted as a person or machine is approaching an area being cleaned (prior to the person or machine entering the area being cleaned) and a predicted course would lead to the person or machine entering the area being cleaned. In some cases, the person or machine may reply to the alert indicating that they cannot leave the area being cleaned. In other cases, the person or machine may not response but may stay in the area being cleaned beyond a predetermined time limit. In these cases, the robotic cleaning device may terminate cleaning the area.

At block 375, the cleaning control system may determine if there is a need to rework the area where the person or machine was detected. For example, the cleaning control system may reschedule the cleaning for one or more of the following reasons the person or machine indicates they cannot leave the area, the person or machine exceeds a time limit in the area being cleaned, or the person or machine crosses over a portion of the area being cleaned exceeding a threshold area. The previous examples are not an exhaustive list of reasons to schedule rework of an area. At block 380, the method 300 ends when the floor cleaning is complete.

Figure 4:
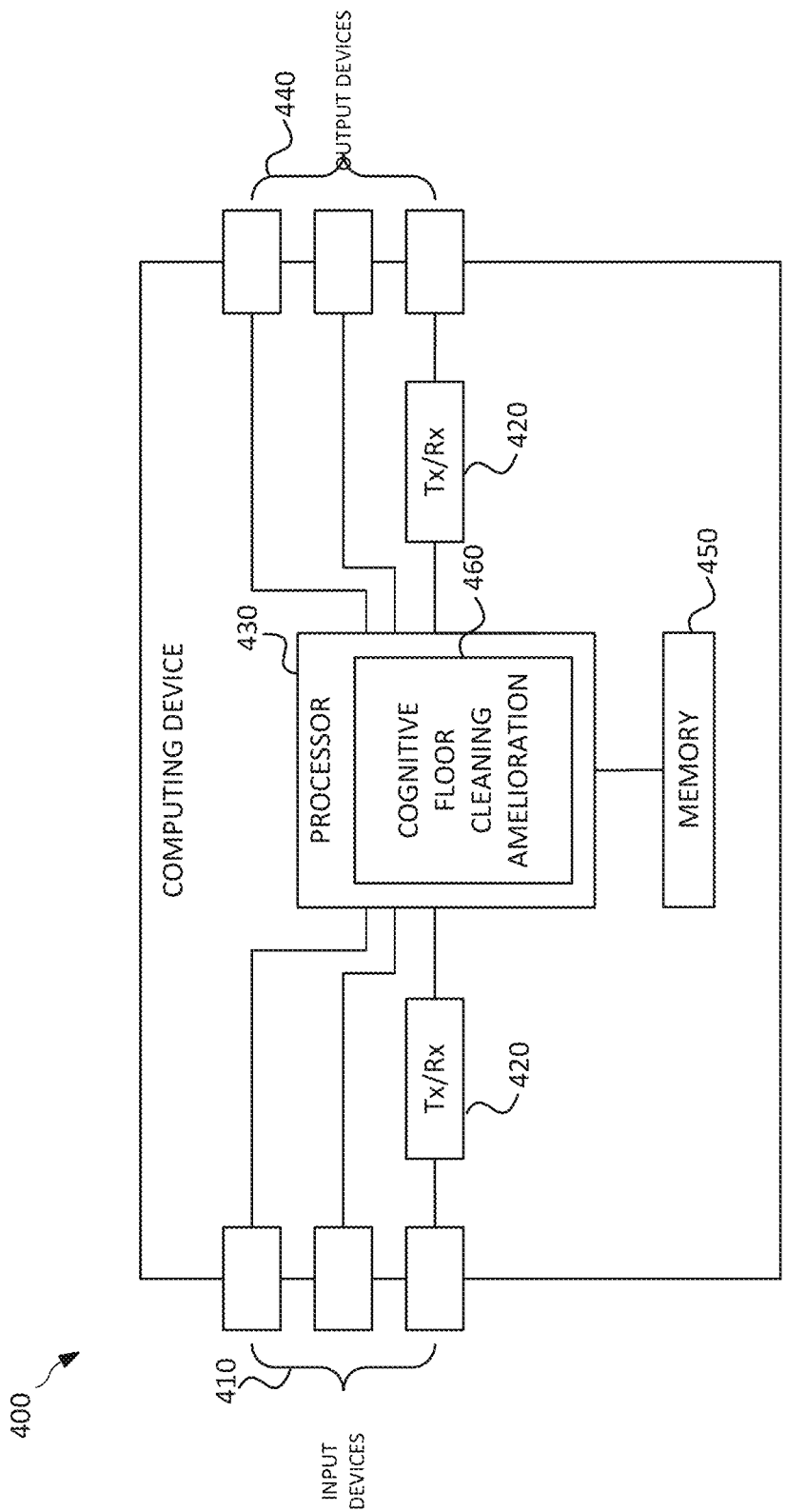
FIG. 4 depicts a computing device according to various embodiments.

With reference now to FIG. 4, a schematic diagram of a computing device 400 according to various embodiments is shown. Computing device 400 may be any suitable processing device capable of performing the functions disclosed herein such as a computer system, a server, a cloud computing node (e.g., as discussed below with respect to FIG. 5 and/or FIG. 6), or may be generally representative of a distributed computing device in which one or more components of computing device 400 are distributed or shared across one or more devices. Computing device 400 is configured to implement at least some of the features/methods disclosed herein, for example, the cleaning control system 165 and/or 200, the robotic cleaning device 160 and/or 210 and/or method 300, discussed above. In various embodiments, for instance, the features/methods of this disclosure are implemented using hardware, firmware, and/or software installed to run on hardware.

Computing device 400 is a device (e.g., an access point, an access point station, a router, a switch, a gateway, a bridge, a server, a client, a user-equipment, a mobile communications device, etc.) that transports data through a network, system, and/or domain, and/or provides services to other devices in a network or performs computational functions. In one embodiment, the computing device 400 is an apparatus and/or system configured to implement the cleaning control system 165 and/or 200, the robotic cleaning device 160 and/or 210 and/or method 300, for example according to a computer program product.

The computing device 400 comprises one or more downstream ports 410 coupled to a transceiver (Tx/Rx) 420, which are transmitters, receivers, or combinations thereof. The Tx/Rx 420 transmits and/or receives frames from other computing devices via the downstream ports 410. Similarly, the computing device 400 comprises another Tx/Rx 420 coupled to a plurality of upstream ports 440, wherein the Tx/Rx 420 transmits and/or receives frames from other nodes via the upstream ports 440. The downstream ports 410 and/or the upstream ports 440 may include electrical and/or optical transmitting and/or receiving components. In another embodiment, the computing device 400 comprises one or more antennas coupled to the Tx/Rx 420. The Tx/Rx 420 transmits and/or receives data (e.g., packets) from other computing or storage devices wirelessly via the one or more antennas.

A processor 430 is coupled to the Tx/Rx 420 and is configured to execute a cleaning control system and/or control a robotic cleaning device. In an embodiment, the processor 430 comprises one or more multi-core processors and/or memory modules 450, which functions as data stores, buffers, etc. The processor 430 is implemented as a general processor or as part of one or more application specific integrated circuits (ASICs), field-programmable gate arrays (FPGAs), and/or digital signal processors (DSPs). Although illustrated as a single processor, the processor 430 is not so limited and alternatively comprises multiple processors. The processor 430 further comprises processing logic configured to execute a cognitive floor cleaning amelioration computer program product 460 that is configured to consider various parameters which influence cleaning and predict scenarios which can create rework.

FIG. 4 also illustrates that a memory module 450 is coupled to the processor 430 and is a non-transitory medium configured to store various types of data. Memory module 450 comprises memory devices including secondary storage, read-only memory (ROM), and random-access memory (RAM). The secondary storage is typically comprised of one or more disk drives, optical drives, solid-state drives (SSDs), and/or tape drives and is used for non-volatile storage of data and as an over-flow storage device if the RAM is not large enough to hold all working data. The secondary storage is used to store programs that are loaded into the RAM when such programs are selected for execution. The ROM is used to store instructions and perhaps data that are read during program execution. The ROM is a non-volatile memory device that typically has a small memory capacity relative to the larger memory capacity of the secondary storage. The RAM is used to store volatile data and perhaps to store instructions. Access to both the ROM and RAM is typically faster than to the secondary storage.

The memory module 450 may be used to house the instructions for carrying out the various embodiments described herein. For example, the memory module 450 may comprise the cognitive floor cleaning amelioration computer program product 460, which is executed according by processor 430.

It is understood that by programming and/or loading executable instructions onto the computing device 400, at least one of the processor 430 and/or the memory module 450 are changed, transforming the computing device 400 in part into a particular machine or apparatus, for example, a cleaning control system and/or a robotic cleaning device. It is fundamental to the electrical engineering and software engineering arts that functionality that can be implemented by loading executable software into a computer can be converted to a hardware implementation by well-known design rules known in the art. Decisions between implementing a concept in software versus hardware typically hinge on considerations of stability of the design and number of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable and will be produced in large volume may be preferred to be implemented in hardware (e.g., in an ASIC) because for large production runs the hardware implementation may be less expensive than software implementations. Often a design may be developed and tested in a software form and then later transformed, by design rules well-known in the art, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a RAM, a ROM, an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 5:
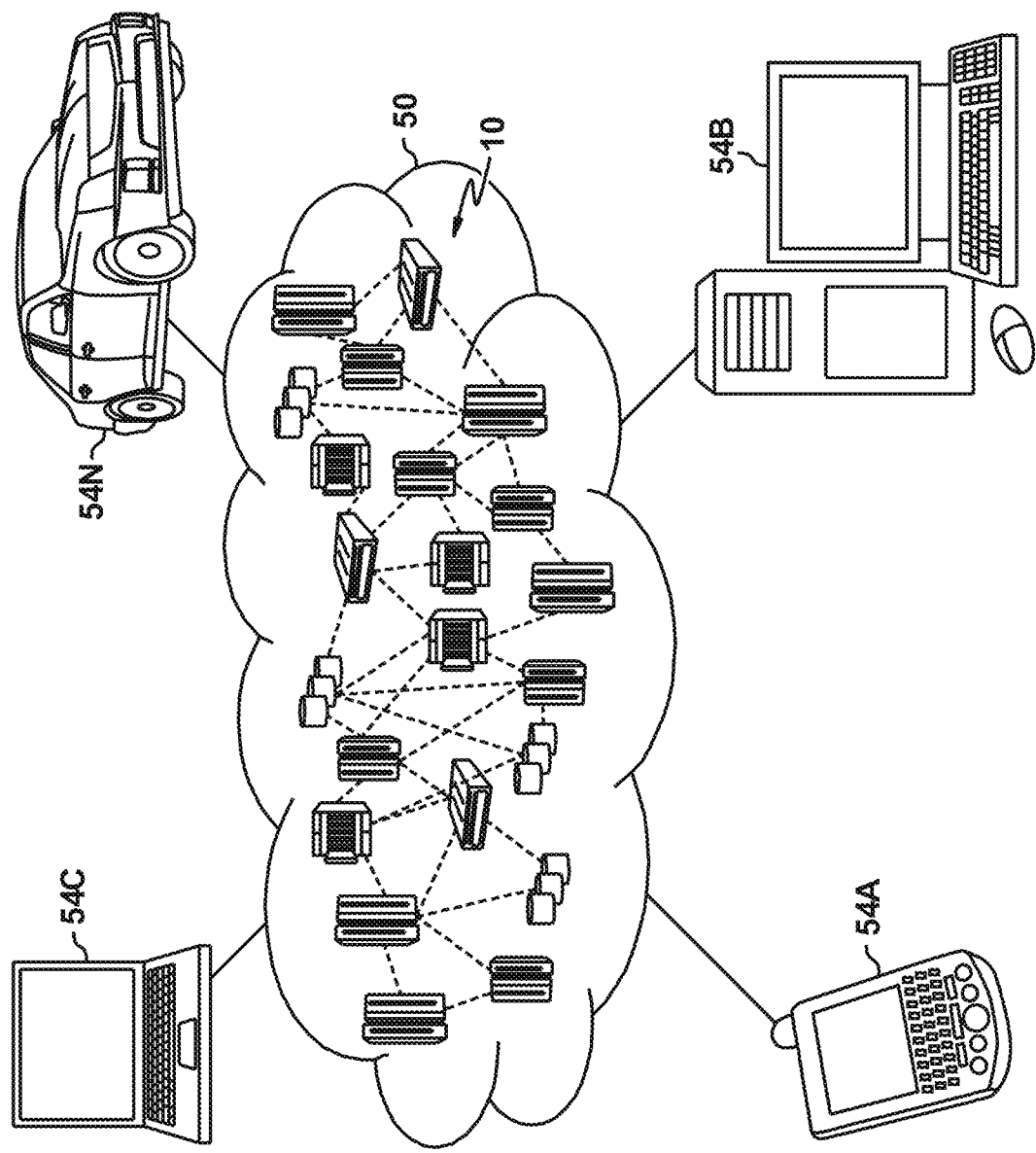
FIG. 5 depicts a cloud computing environment according to various embodiments.
Figure 6:
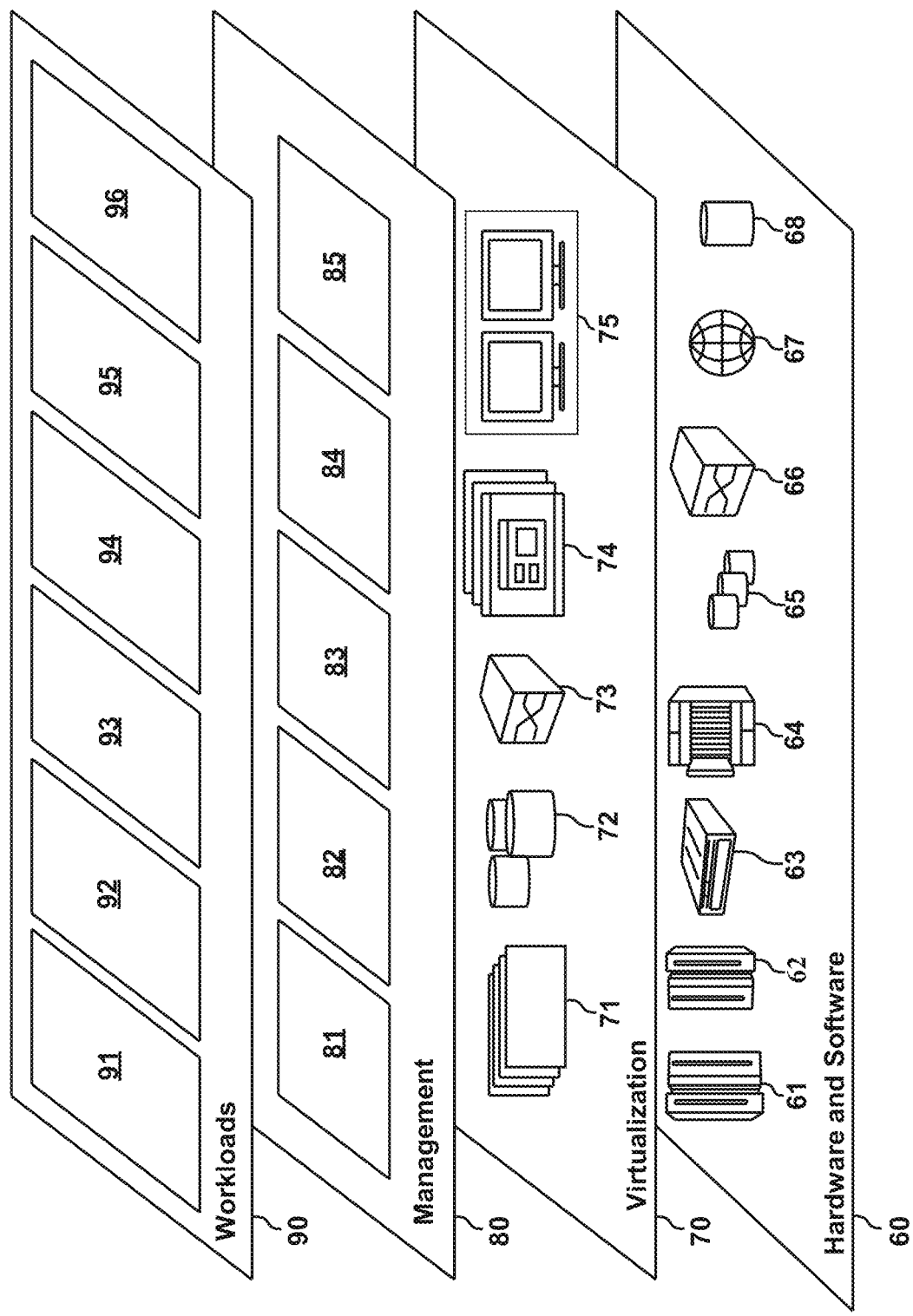
FIG. 6 depicts abstraction model layers according to various embodiments.

Turning now to FIGS. 5 and 6, it is to be understood that although this disclosure includes a detailed description related to cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

The cloud model characteristics may include on-demand self-service, broad network access, resource pooling, rapid elasticity, and/or measured service. On-demand self-service is a characteristic in which a cloud consumer can unilaterally provision computing capabilities, such as server time and network storage, as needed automatically without requiring human interaction with the service's provider. Broad network access is a characteristic in which capabilities are available over a network and accessed through standard mechanisms that promote use by heterogeneous thin or thick client platforms (e.g., mobile phones, laptops, and personal digital assistants (PDAs)). Resource pooling is a characteristic in which the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity is a characteristic in which capabilities can be rapidly and elastically provisioned, in some cases automatically, to quickly scale out and rapidly released to quickly scale in. To the consumer, the capabilities available for provisioning often appear to be unlimited and can be purchased in any quantity at any time. Measured service is a characteristic in which cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

The cloud model Service Models may include Software as a Service (SaaS), Platform as a Service (PaaS), and/or Infrastructure as a Service (IaaS).

SaaS is a service model in which the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. PaaS is a service model in which the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. IaaS is a service model in which the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The cloud model Deployment Models may include private cloud, community cloud, public cloud, and/or hybrid cloud. Private cloud is a deployment model in which the cloud infrastructure is operated solely for an organization. It may be managed by the organization or a third party and may exist on-premises or off-premises. Community cloud is a deployment model in which the cloud infrastructure is shared by several organizations and supports a specific community that has shared concerns (e.g., mission, security requirements, policy, and compliance considerations). It may be managed by the organizations or a third party and may exist on-premises or off-premises. Public cloud is a deployment model in which the cloud infrastructure is made available to the general public or a large industry group and is owned by an organization selling cloud services. Hybrid cloud is a deployment model in which the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 5, illustrative cloud computing environment 50 is depicted. As shown, cloud computing environment 50 includes one or more cloud computing nodes 10 with which local computing devices used by cloud consumers, such as, for example, PDA or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that cloud computing nodes 10 and cloud computing environment 50 can communicate with any type of computerized device over any type of network and/or network addressable connection (e.g., using a web browser).

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68. The hardware and software components of hardware and software layer 60 may serve as the underlying computing components on which cloud computing functions are executed in response to receipt of a request for performance of a function and/or service offered as a part of cloud computing environment 50 such as, for example, the gesture meaning determination described below.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. These virtual entities may enable a subscriber to cloud computing environment 50 to interact indirectly with the hardware and software components of hardware and software layer 60 indirectly via virtual layer 70 without having a specific knowledge of, or interacting directly with, hardware and software layer 60. For example, a plurality of subscribers may interact with virtualization layer 70 to respectively access a corresponding plurality of virtual servers 71 and virtual storage 72 that all exist as separate threads, instances, partitions, etc. on a single server 62 and storage device 65, respectively. In such a scenario, virtualization layer 70 may cause each virtual server 71 and virtual storage 72 to appear to each subscriber as a dedicated and seamless computing and storage device, while enabling efficient operation of the hardware and software components of hardware and software layer 60 by reducing a potential for redundancy of components.

In one example, management layer 80 may provide the functions described below via an abstraction layer such that a subscriber to cloud computing environment 50 may interact with virtualization layer 70 and/or hardware and software layer 60 indirectly via management layer 80 without having a specific knowledge of, or interacting directly with, virtualization layer 70 and/or hardware and software layer 60. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA. Management layer 80 enables a subscriber to cloud computing environment 50 to interact with cloud computing environment 50 through management layer 80 to perform tasks and functions (e.g., administrative tasks) separate from actual execution of functions in the cloud computing environment 50. For example, an administrator may request access to a certain amount of computing resources (e.g., as provided in virtualization layer 70 and/or hardware and software layer 60) in cloud computing environment 50 via management layer 80 without having a specific knowledge of, or interacting directly with, virtualization layer 70 and/or hardware and software layer 60.

Workloads layer 90 provides examples of functionality for which the cloud computing environment may be utilized. The workloads and functions illustrated in workloads layer 90 are merely exemplary workloads and functions that may be executed in cloud computing environment 50 at the request or direction of a subscriber to cloud computing environment 50, and are not limited to those explicitly recited herein. Examples of workloads and functions which may be provided from this layer include: mapping and navigation 91; software development and lifecycle management 92; virtual classroom education delivery 93; data analytics processing 94; transaction processing 95; and wildfire prediction 96. These workloads and functions of workloads layer 90 may be end-user applications that enable a subscriber to cloud computing infrastructure 50 to interact with any of management layer 80, virtualization layer 70, and/or hardware and software layer 60 indirectly via workloads layer 90 without having a specific knowledge of, or interacting directly with, any of management layer 80, virtualization layer 70, and/or hardware and software layer 60. In this manner, the subscriber and/or an end user who accesses cloud computing infrastructure 50 may not require any form of specialized knowledge relating to the composition or operation of any of management layer 80, virtualization layer 70, and/or hardware and software layer 60 to perform the workloads and functions of workloads layer 90. In such a scenario, the workloads and functions of workloads layer 90 are said to be abstracted from management layer 80, virtualization layer 70, and hardware and software layer 60 because workloads layer 90 hides the underlying operation of management layer 80, virtualization layer 70, and hardware and software layer 60 from the subscriber and/or end-user while still enabling the subscriber and/or end-user to indirectly interact with management layer 80, virtualization layer 70, and/or hardware and software layer 60 to receive the computer processing benefits thereof via workloads layer 90.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product for cognitive floor cleaning, the computer program product comprising a non-transitory computer readable storage medium having program instructions embodied therewith, the program instructions executable by a processor to cause the processor to:
receive data regarding an area to be cleaned, wherein the data comprises movement paths of people or machines through the area to be cleaned, and wherein the data further comprises air flow data indicating an air flow pattern through the area to be cleaned;
train a machine learning cleaning model based on the data;
create a floor cleaning plan using the machine learning cleaning model, wherein the floor cleaning plan identifies a cleaning time that minimizes a likelihood of a robotic cleaning device encountering a person or a machine while cleaning based on the movement paths, and wherein the floor cleaning plan minimizes dust blowing onto a cleaned area of the area to be cleaned based on the air flow data; and
control the robotic cleaning device based on the floor cleaning plan.

2. The computer program product of claim 1, wherein executing a set of instructions further causes the processor to transmit, prior to the robotic cleaning device beginning cleaning, an alert comprising an identifier of the area to be cleaned and the cleaning time.

3. The computer program product of claim 2, wherein the alert further comprises an alternate route to avoid the area to be cleaned.

4. The computer program product of claim 1, wherein executing a set of instructions further causes the processor to:
detect, after the robotic cleaning device begins cleaning, a person or a machine in the area to be cleaned; and
transmit, to the person or the machine an alert.

5. The computer program product of claim 4, wherein executing the set of instructions further causes the processor to receive a message from the person or the machine indicating the person or the machine will remain in the area to be cleaned.

6. The computer program product of claim 5, wherein executing the set of instructions further causes the processor to determine a schedule for rework cleaning of the area to be cleaned.

7. The computer program product of claim 1, wherein the air flow pattern accounts for air flow caused by an air heating ventilation and cooling (HVAC), doors opening and closing, exterior wind, and movement of people and machines through the area to be cleaned.

8. A computer-implemented method comprising:
receiving data regarding an area to be cleaned, wherein the data comprising movement paths of people or machines through the area to be cleaned, and wherein the data further comprises air flow data indicating an air flow pattern through the area to be cleaned;
training a machine learning cleaning model based on the data;
creating a floor cleaning plan using the machine learning cleaning model, wherein the floor cleaning plan identifies a cleaning time that minimizes a likelihood of a robotic cleaning device encountering a person or a machine while cleaning based on the movement paths, and wherein the floor cleaning plan minimizes dust blowing onto a cleaned area of the area to be cleaned based on the air flow data; and
control the robotic cleaning device based on the floor cleaning plan.

9. The computer-implemented method of claim 8, further comprising transmitting, prior to the robotic cleaning device beginning cleaning, an alert comprising an identifier of the area to be cleaned and the cleaning time.

10. The computer-implemented method of claim 9, wherein the alert further comprises an alternate route to avoid the area to be cleaned.

11. The computer-implemented method of claim 8, further comprising:
detecting, after the robotic cleaning device begins cleaning, a person or a machine in the area to be cleaned; and
transmitting, to the person or the machine an alert.

12. The computer-implemented method of claim 11, further comprising receiving a message from the person or the machine indicating the person or the machine will remain in the area to be cleaned.

13. The computer-implemented method of claim 12, further comprising determining a schedule for rework cleaning of the area to be cleaned.

14. The computer-implemented method of claim 8, wherein the air flow pattern accounts for air flow caused by an air heating ventilation and cooling (HVAC), doors opening and closing, exterior wind, and movement of people and machines through the area to be cleaned.

15. A system comprising memory configured to store instructions; and one or more processors coupled to the memory and configured to execute the instructions to:
receive data regarding an area to be cleaned, wherein the data comprising movement paths of people or machines through the area to be cleaned, and wherein the data further comprises air flow data indicating an air flow pattern through the area to be cleaned;
train a machine learning cleaning model based on the data;
create a floor cleaning plan using the machine learning cleaning model, wherein the floor cleaning plan identifies a cleaning time that minimizes a likelihood of a robotic cleaning device encountering a person or a machine while cleaning based on the movement paths, and wherein the floor cleaning plan minimizes dust blowing onto a cleaned area of the area to be cleaned based on the air flow data; and
control the robotic cleaning device based on the floor cleaning plan.

16. The system of claim 15, wherein the processor is further configured to execute the instructions to transmit, prior to the robotic cleaning device beginning cleaning, an alert comprising an identifier of the area to be cleaned and the cleaning time.

17. The system of claim 16, wherein the alert further comprises a n alternate route to avoid the area to be cleaned.

18. The system of claim 15, wherein the processor is further configured to execute the instructions to:
detect, after the robotic cleaning device begins cleaning, a person ora machine in the area to be cleaned; and
transmit, to the person or the machine an alert.

19. The system of claim 18, wherein the processor is further configured to execute the instructions to receive a message from the person or the machine indicating the person or the machine will remain in the area to be cleaned.

20. The system of claim 19, wherein the processor is further configured to execute the instructions to determine a schedule for rework cleaning of the area to be cleaned.

* * * * *